US007613691B2

(12) United States Patent
Finch

(10) Patent No.: US 7,613,691 B2
(45) Date of Patent: Nov. 3, 2009

(54) DYNAMIC INSERTION OF SUPPLEMENTAL VIDEO BASED ON METADATA

(75) Inventor: Gregory D. Finch, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 265 days.

(21) Appl. No.: 11/425,570

(22) Filed: Jun. 21, 2006

(65) Prior Publication Data

US 2007/0299870 A1 Dec. 27, 2007

(51) Int. Cl.
*G06F 17/30* (2006.01)
(52) U.S. Cl. .............................. 707/3; 725/32; 725/41; 725/42; 725/46
(58) Field of Classification Search ................ 707/103, 707/104.1, 3; 725/88, 90, 102, 42, 46, 41
See application file for complete search history.

(56) References Cited

U.S. PATENT DOCUMENTS

| 6,446,261 | B1 | 9/2002 | Rosser | |
| 6,698,020 | B1 | 2/2004 | Zigmond et al. | |
| 6,704,930 | B1 | 3/2004 | Eldering et al. | |
| 6,950,623 | B2 | 9/2005 | Brown et al. | |
| 2001/0042249 | A1* | 11/2001 | Knepper et al. | 725/42 |
| 2002/0120929 | A1 | 8/2002 | Schwalb et al. | |
| 2002/0161739 | A1 | 10/2002 | Oh | |
| 2003/0093792 | A1* | 5/2003 | Labeeb et al. | 725/46 |
| 2004/0103429 | A1 | 5/2004 | Carlucci et al. | |
| 2004/0194131 | A1* | 9/2004 | Ellis et al. | 725/34 |
| 2005/0076357 | A1 | 4/2005 | Fenne | |
| 2005/0076359 | A1 | 4/2005 | Pierson et al. | |
| 2006/0026628 | A1 | 2/2006 | Wan et al. | |
| 2006/0242016 | A1* | 10/2006 | Chenard | 705/14 |
| 2007/0035664 | A1* | 2/2007 | Kamada et al. | 348/565 |
| 2007/0078712 | A1* | 4/2007 | Ott et al. | 705/14 |
| 2007/0124282 | A1* | 5/2007 | Wittkotter | 707/3 |

(Continued)

FOREIGN PATENT DOCUMENTS

WO        WO0117250 A1      3/2001

(Continued)

OTHER PUBLICATIONS

Chorianopoulos et al. "Affective Usability Evaluation for an Interactive Music Television Channel," ACM Computers in Entertainment, Jul. 2004, pp. 1-11, vol. 2, No. 3, Article 7b, New York, NY.

(Continued)

*Primary Examiner*—Etienne P LeRoux
*Assistant Examiner*—Thuy (Tiffany) Bui
(74) *Attorney, Agent, or Firm*—Senniger Powers LLP

(57) ABSTRACT

A media service application responsive to a media retrieval request received from a user of client computer to retrieve a video designated by the retrieval request. The media service retrieves relevant advertisements as a function of metadata included in the video file and/or stored personal preference data of the user. If the retrieval request is an online viewing request the media service application integrates the retrieved advertisements into the retrieved video and transfers an integrated video/advertisement file to the client If the retrieval request is a download request the media service application transfers the retrieved ad and retrieved video to the client as separate files for integration by the client during playback of the video.

16 Claims, 6 Drawing Sheets

U.S. PATENT DOCUMENTS

2007/0204310 A1* 8/2007 Hua et al. .................... 725/88
2008/0163287 A1* 7/2008 Fernandez .................... 725/31

FOREIGN PATENT DOCUMENTS

WO WO0219237 A1 3/2002

OTHER PUBLICATIONS

Chorianopoulos et al., "Intelligent User Interfaces in the Living Room: Usability Design for Personalized Television Applications," In Proceedings of the 2003 International Conference on Intelligent User Interfaces, (IUI '03), Jan. 12-15, 2003, pp. 230-232, ACM Press, 200, Miami, U.S.

Unknown, "Opent TV Advertise," 28 pages, printed Jun. 15, 2006, http://www.opentv.com/files/opentv_advertise_white_paper_april_2005.pdf, U.S.

Unknown, "Windows Media and Web Distribution for Broadcasters," 4 pages, printed Jun. 15, 2006, http://www.microsoft.com/windows/windowsmedia/forpros/content_provider/broadcast/default.aspx, U.S.

* cited by examiner

DYNAMIC INSERTION OF SUPPLEMENTAL VIDEO BASED ON METADATA

BACKGROUND

Conventional delivery of video programming involves distributing video content to users via terrestrial, cable, and satellite systems. With the advent of faster Internet connection speeds and greater bandwidth, increasing numbers of users access video content online. Video on demand systems allow users to access video content over a global communications network, such as the Internet, and watch selected content on their computers, portable computing devices, and the like. Typical video on demand, or online video, services stream this video content to users over the network for viewing while the video is being transferred to their computing devices. Recently, some video content providers have begun allowing users to download video content for viewing on their computing devices after completion of the download. In addition to allowing offline viewing, downloading a video file in its entirety to the user's computing device allows the user to obtain higher quality video content and, thus, improves user experience.

Much like conventional video delivery, advertising provides a major source of revenue for online video services. Unfortunately, a particular end user may have no interest in the goods or services being advertised in the particular video they are viewing, and, thus, can be left with a less than stellar opinion of the online video service.

SUMMARY

Embodiments of the invention overcome one or more deficiencies in known online video services and media player systems by the delivery of ads in connection with downloaded media content that are more likely of interest to the end-user. Advantageously, aspects of the invention utilize video metadata and/or user preference data to integrate relevant ads in a video being watched or downloaded via an online video service. In this manner, playback of advertisement content may be made conditional on the type of video content being downloaded and/or end user preference data.

Computer-readable media having computer-executable instructions for ad playback in connection with downloaded video embody further aspects of the invention. Alternatively, embodiments of the invention may comprise various other methods and apparatuses.

Other features will be in part apparent and in part pointed out hereinafter.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
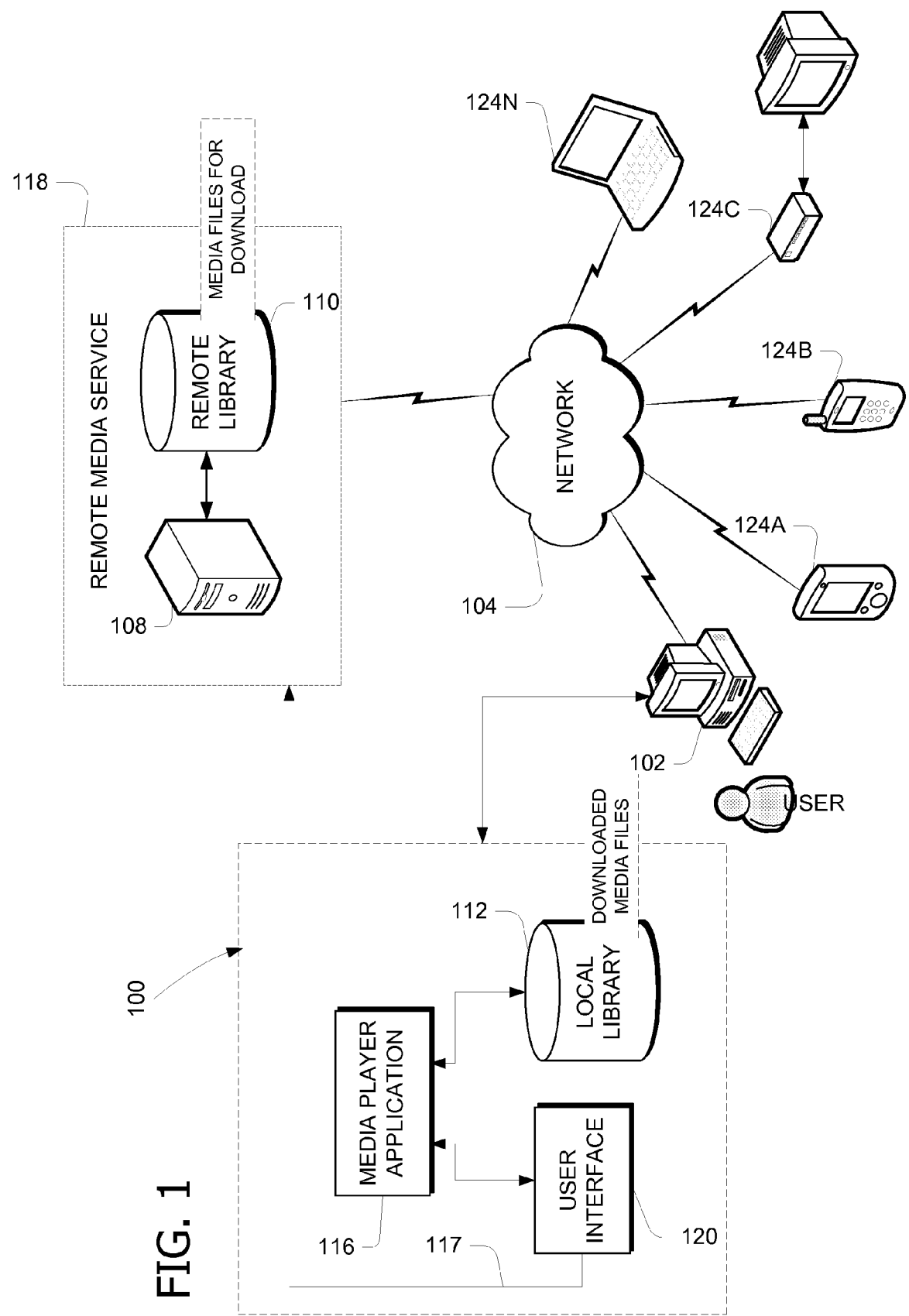
FIG. 1 is a block diagram illustrating one example of a suitable computing system environment in which aspects of the invention may be implemented.

Referring now to the drawings, FIG. 1 illustrates an exemplary computing environment in which embodiments of the present invention may be implemented for enforcing the rendering of predetermined media content to the user of a download media content service. As described in detail below, aspects of the invention manage the integration ads into media content such as a video selected by an end-user for viewing and/or downloading from media content service. In one embodiment, a topic of one or more scenes included in the selected video is determined as a function of metadata included in each scene and a relevant advertisement video clip is identified from a collection of available ads and integrated into the selected video. In an alternative embodiment, user preference data is also utilized to identify a relevant advertisement video clip for integration into the selected video.

Although described primarily in the context of video media files, aspects of the invention may be applied to various forms of digital media, including video and multimedia files (e.g., movies, movie trailers, television shows, etc.), audio files (e.g., music tracks, news reports, audio web logs, audio books, speeches, comedy routines, etc.), and images.

In FIG. 1, a media system 100 includes one or more client computing devices such as a computer 102 coupled to a data communication network 104. One or more server computers 108 are also coupled to the network 104. As shown, the system 100 includes a memory area or database, illustrated here as a remote library 110 associated with server 108. The computer 102 may access the server 108 (and the information in the database 110) via network 104. As an example, network 104 is the Internet (or the World Wide Web) but aspects of the present invention may be applied to any data communication network. Server 108 and computer 102 communicate in the illustrated embodiment using, for example, the hypertext transfer protocol (HTTP).

Referring further to FIG. 1, the user's computer 102 can access one or more digital media files stored locally in the form of, for example, a local media library 112. For instance, the digital media files contain video or other media content downloaded from database 110 and adapted for rendering on computer 102. The local media library 112 may reside on the computer's hard drive, a removable computer-readable storage medium, or the like. In the illustrated embodiment, computer 102 executes a playback engine, such as a media player application 116, for rendering selected media files from local media library 112. Those skilled in the art are familiar with such software routines that, when executed by a computer, render media content and retrieve, store, and display contextual information. The media player application 116 may be any suitable media player that is configured to play digital media so that a user can experience the content that is embodied on the media. For example, a media player application embodying aspects of the invention may be built on Microsoft Corporation's Windows Media™ Player program.

Aspects of the invention also include communication between the media player application 116 executed on computer 102 and one or more remote media services 118. For example, the remote media service 118 is an online video or video on demand service that provides video content such as television programs, movies, video clips, and the like for downloading and viewing by the user. In one embodiment, an online media content provider such as remote media service 118 utilizes one or more servers 108 for maintaining a catalog of available media files, that is, a remote library, in database 110. Those skilled in the art are familiar with such services from which a user may download media files and/or stream them via the Internet, usually for a monthly subscription price or on a per-file basis. For example, the remote library contains the inventory of the online media content provider.

The system 100 of FIG. 1 permits the user to render a downloaded media file on an enabled media playing device (e.g., computer 102 running Microsoft® Windows® operating system and Windows Media™ Player program)

A user interface 120 associated with media player application 116 communicates information to the user and receives instructions and feedback from the user. In one embodiment, media player application 116 is responsive to user input via the user interface 120 to generate a media retrieval request to the server that is supplied to the remote media service, as indicated by reference character 117, to select media content from remote media service 118 for downloading to computer 102 and performing one or more media player operations. In addition to playback or transport controls, typical media player operations include, for example: displaying metadata associated with the media files; rendering, copying, or downloading selected media files; rendering samples of selected media files; assigning media files to one or more playlists; searching or sorting the media files according to their metadata or content; displaying media library contents; scrolling through the media library contents; and displaying contextual menus of available media player operations. Other user interfaces different from those described above are contemplated as within the scope of the claimed invention. Those skilled in the art are familiar with a variety of input devices that may be connected to computer 102 for receiving input via user interface 120.

The media system 100 implements ad selection and integration into media content selected for downloading and or viewing in accordance with aspects of the invention. As described above, computer 102 executes media player application 116 for rendering one or more media files. In this instance, local library 112, which may be stored on the hard drive of computer 102 or a removable storage device associated with the computer, contains one or more media files. In addition, remote library 110 contains one or more media files. Although library 110 is remote from computer 102, its media files are accessible by media player application 116 via network 104. The system 100 operates on one or more media items selected from a collection or multiple collections (e.g., local library 112 and/or library 110) of media items selected for consumption by the user. Although sometimes referred to as a playback, it is to be understood that media player application 116 may render media files not only by playing but also by other means (e.g., viewing, accessing, etc.).

Referring again to FIG. 1, in an alternative embodiment of the present invention, a remote computing device 124 executes media player application 116, or a reduced version of media player application 116, for rendering selected media content. The remote computing device 124 may a portable device such as a PDA 124A, mobile phone 124B, network media player or gaming system 124C (and associated monitor), laptop computer 124N, or the like. Although illustrated as communicating via network 104, it is to be appreciated that a number of wired and wireless network formats are available enabling communication between local computer 102 and remote device 124.

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Figure 2:
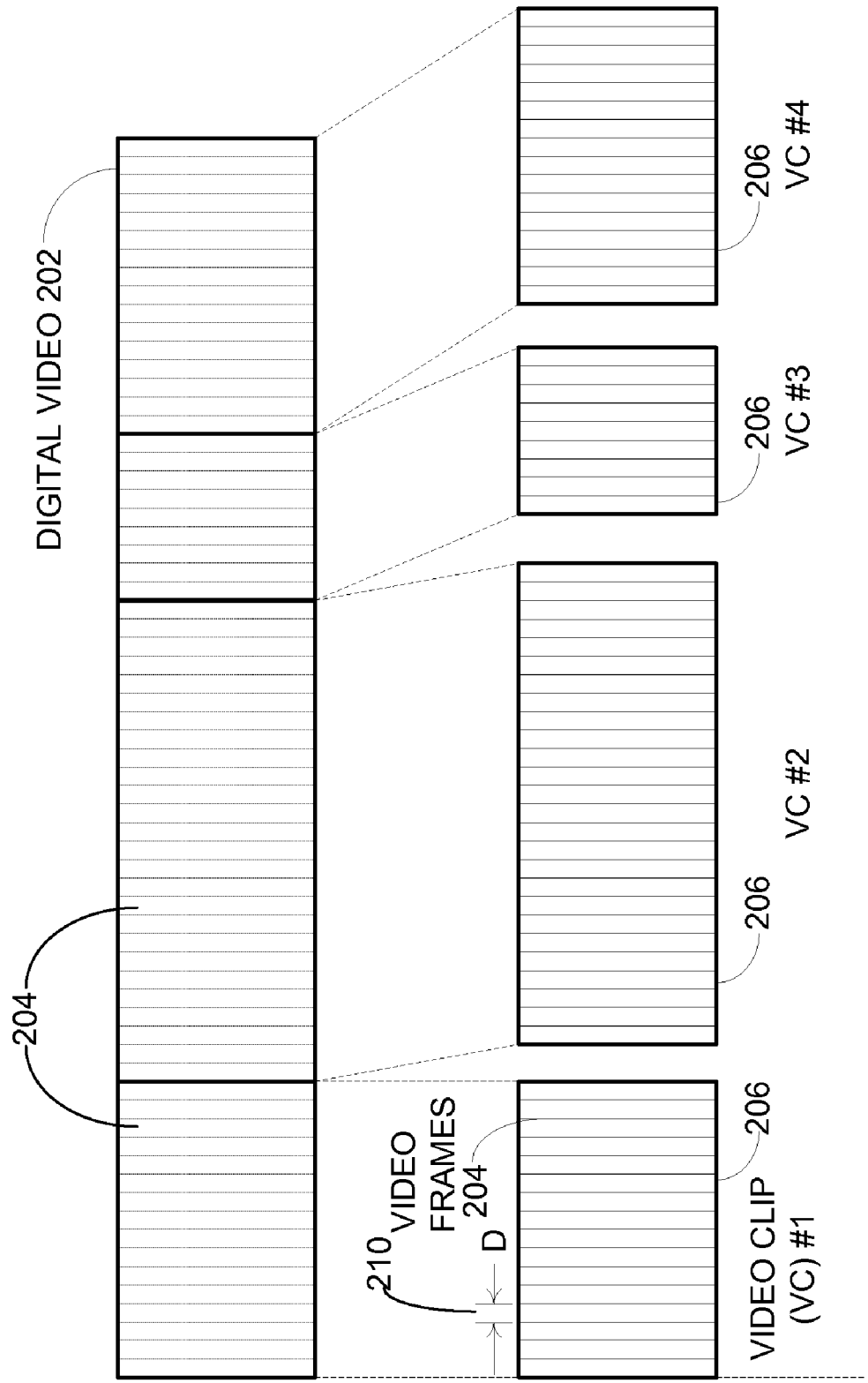
FIG. 2 is an exemplary block diagram illustrating three fundamental levels of a digital video file or a digital video.

Referring to FIG. 2, an exemplary block diagram illustrates three fundamental levels of a digital video file 202 (also referred to herein as a video data stream or video). At a fundamental or base level, digital video 202 comprises multiple video frames 204, each video frame 204 may have a fixed duration D and a known date and time at which the recording began. As known to those skilled in the art, the duration of a video frame 204 is typically a small fraction of one second (e.g., $\frac{1}{30}$, $\frac{1}{25}$ or $\frac{1}{24}$) but may be any other value or may vary from frame to frame within a single video 202.

At the next higher level, digital video 202 comprises multiple video shots, or clips 206 including one or more video frames 204. Within video clip 206, each subsequent video frame 204 after the first video frame 204 in the shot has a start time equal to the start time of the previous video frame 204 plus the duration D, as indicated by reference character 210, of the previous video frame 204. As known to those skilled in the art, the difference between the last frame of one clip and the first frame of the next clip is greater than the duration of a single video frame 204. Each video frame 204 in a particular video clip 206 includes metadata related to that particular clip. For example, each frame 204 includes a metadata property that defines a topic of one or scenes associated with the video clip 206. In this exemplary video 202, there are four video clips 206 (e.g., VC#1, VC#2, VC#3, and VC#4).

Figure 3:
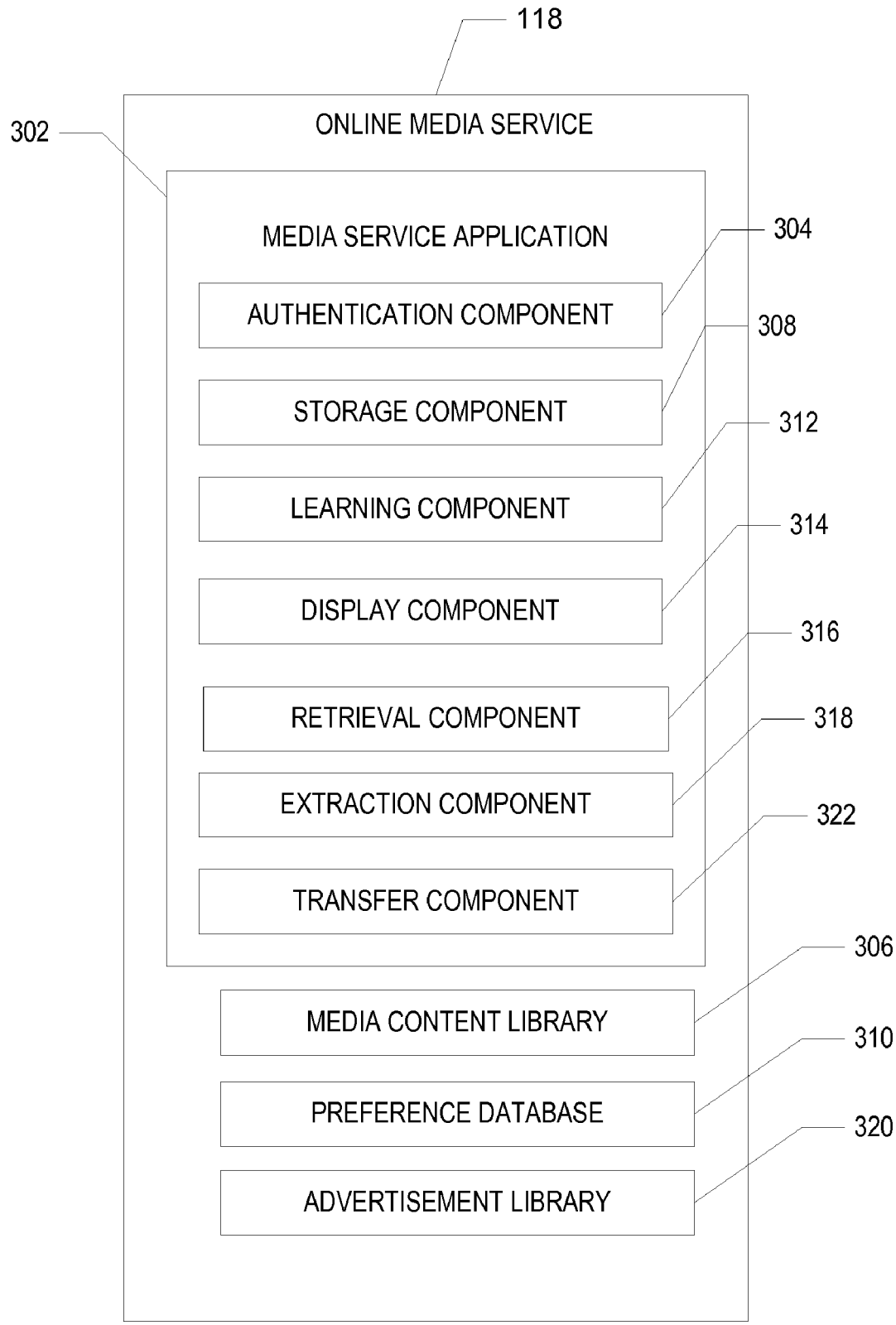
FIG. 3 is a block diagram illustrating components of a server application of an online video service according to one embodiment to the invention.

Referring now to FIG. 3, a block diagram illustrates components of a media service application 302 of online media service 118 according to one embodiment to the invention. An authentication component 304 is responsive to a media retrieval request (e.g., media retrieval request 117) received from a client computer such as computer 102 to determine if the user is authorized to access the media content (e.g., videos) available in a media content library 306. For example, the authentication component 304 presents a login form (not shown) to the user to collect user identification information and/or a password, and compares the collected data to authentication data stored in an authentication database (not shown) linked to the media service 118 to determine if the user is authorized.

If this is the user's first time using the media service 118, the user can complete an online registration form (not shown). After successful registration, the user can define a unique identification data (i.e., user ID) and/or a password to be used for gaining access to the available media content. During this initial registration process, the user may also define user personal preference data. For example, the user enters personal information such as hobbies, favorite movies, favorite scenes, age, gender, marital status, etc. Alternatively, personal preference data can include information that has been learned by the media service application 302 over a period of time. For example, a learning component 312 maintains a record of the content selected by the user for download, and identifies preference data such as the types of videos that are likely of interest to the user based on the user's historical downloading patterns. A storage component 308 indexes personal preference data supplied by users or learned by the learning component 312 according to their defined user ID for storage in a preference database 310.

A display component 314 is responsive to an authenticated media retrieval request to transfer the names or titles of the various videos available in the media content library 306 to the requesting client for display via a display linked to the client computer. The user uses a UI (e.g., user interface 120) linked to the client computer to select one or more of the video files being displayed.

A retrieval component 316 is responsive to user input selecting a particular video via the user interface to retrieve the selected video from the media content library 306 and retrieve user personal preference data from the preference database 310.

An extraction component 318 extracts metadata from each of the video clips included in the selected video. The extracted metadata provides information about the particular clip such as a topic of the scenes included in the video clip (e.g., car chase, sports, romantic dinner, etc.), clip duration, names of actors or actresses appearing in clip, or any other information related to the particular clip and/or video. As known to those skilled in the art, various metadata detection techniques can be used to detect and extract metadata from metadata files. For example, the extraction component 318 can employ any one or more of the following metadata detection techniques to detect and extract metadata: face detection, dynamic image peak detection, color value detection, dynamic image change detection face recognition, music beats detection, audio fingerprint detection, dynamic peaks detection, speech detection, word and phrase detection, and/or any other metadata detection technique.

An advertisement library 320 linked to the server maintains a plurality of advertisement clips for insertion into a selected video. According to aspects of the invention, the advertisements are indexed according to topic. That is, each advertisement stored in the library is associated with a corresponding topic. The retrieval component 316 retrieves advertisements clips from the advertisement library 320 as a function of retrieved user preference data and/or extracted metadata. For example, if user preference data indicates that the user has an interest in cars and the extracted metadata from a particular clip indicates that the topic of the clip is a car chase, the retrieval component 316 retrieves an advertisement clip from the advertisement library 320 associated with the topic cars.

In one embodiment, the user's personal preference data overrides the extracted metadata. That is, the retrieval component 316 assigns priority personal preference data versus extracted metadata when retrieving an advertisement clip from the advertisement library 320. For example, if the metadata indicates the topic of a particular scene is a car chase, but the user personal preference data indicates that the user is interested in motorcycles, the retrieval component will first search for an advertisement related to motorcycles. If there are no ads related to motorcycles in the advertisement library 320, the retrieval component 316 will then search the advertisement library for an advertisement related to cars.

A transfer component 322 determines if the media retrieval request is a request to watch the video online or a request to download the video. For example, the user can initiate a media retrieval request via the client by clicking a download option control (not shown) or a view online option control (not shown) via the user interface 120. If the transfer component 322 determines that the media retrieval request is an online request, the selected video and retrieved ads may be transferred separately to the client. That is, the video file and advertisement clip files are transferred to the client computer as separate files. As explained in more detail below in reference to FIG. 4, after transferring the video and advertisement clip files to the client, the video file is available for rendering by the playback engine 404, and advertisement clips files are available for integration into the video file during playback of the video file on the client 102. On the other hand, if the transfer component 322 determines that the media retrieval request is a download request, the ads are integrated into the selected video file and a single integrated video/ad file is transferred to the client computer 102.

Figure 4:
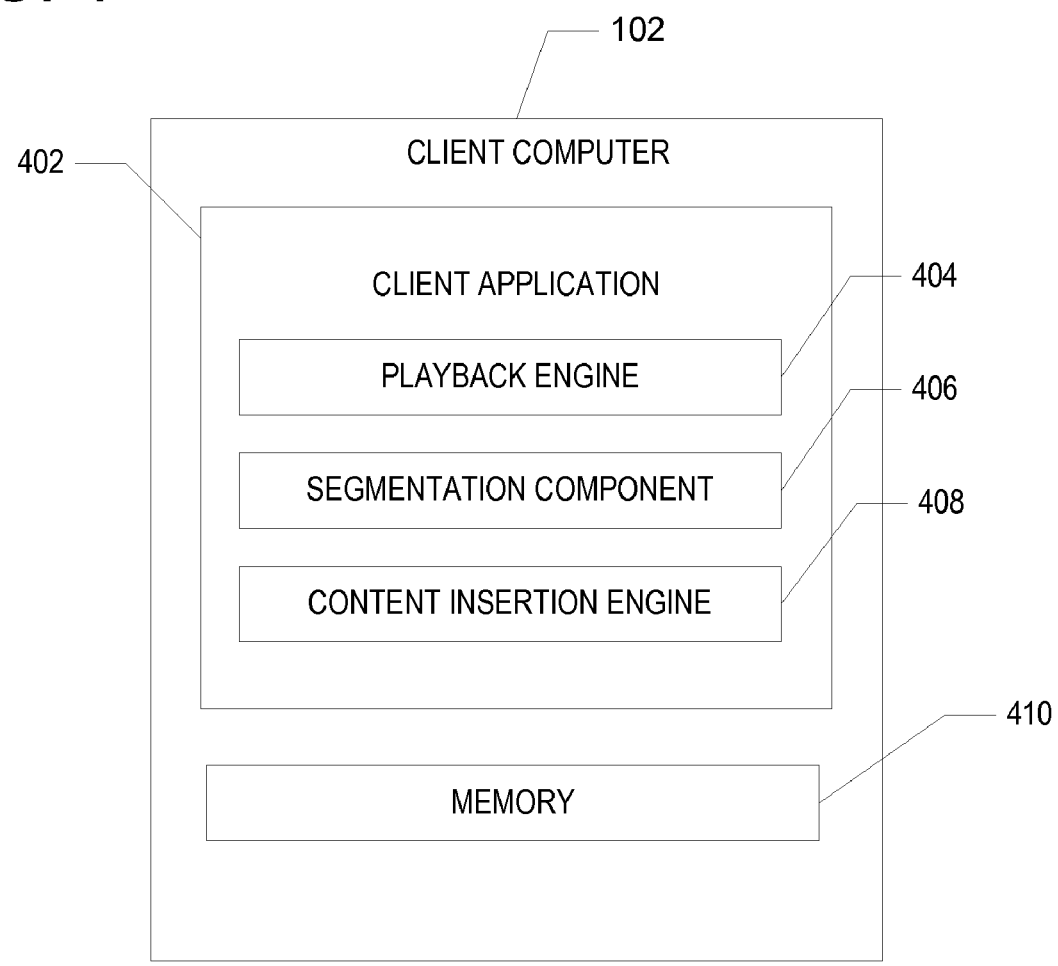
FIG. 4 a block diagram illustrating components of a client application for performing client-based ad insertion according to one embodiment to the invention.

Referring next to FIG. 4, a block diagram shows exemplary components of a client application 402 of a client computer 102 for performing client-based ad insertion. A content insertion process embodying aspects of the invention begins when the user interacts with a graphical user interface (e.g., user interface 120) to select a media file (e.g., video file 202) for rendering by a playback engine 404 (e.g., media player application 116). Advantageously, aspects of the invention provide an ad integration mechanism for ensuring that both the latest and most relevant ads are integrated into the video file during playback on the client computer 102.

In one embodiment, the user selects a media file such as video file 202 from an online media service for playback on the client computer 102. As described above in reference to FIG. 3, one or more predetermined media content files, such as ads are also downloaded to the user's computer 102 for rendering via playback engine 404.

During playback of the video file 202, a segmentation component 406 segments the video 202 into video clips 206 using know segmentation techniques. For example, the segmentation component 406 defines a segment boundary between adjacent video frames 204 as a function of the difference between color histograms of adjacent frames 204 in the video 202. Alternatively, as explained above in reference to FIG. 2, metadata included in each video frame 204 identifies a clip to which it belongs. As a result, the segmentation component 406 can segment the video file 202 into clips 206 based on metadata included in each video frame 204. Thereafter, the segmentation component 406 is responsive to the defined segment boundary to segment the video file 202 into video segments, or video clips 206.

A content insertion engine 408 is responsive to the segmented video file 202 to retrieve the one or more advertisement clips related to the video file 202 from a memory 410 of the client computer 102 and inserts the advertisement clips in the appropriate location in the video 202 during playback of the video on the client computer. According to one aspect of the invention, the content insertion engine 406 determines the location for integrating the advertising clip in to the video file 202 as a function of metadata included in the segmented clips. For example, the content insertion engine 406 inserts ads for cars during segments of the video related to cars and only display these ads to viewers who are interested in cars, thus, insuring that the viewer will be more likely to watch the ad.

Figure 5A:
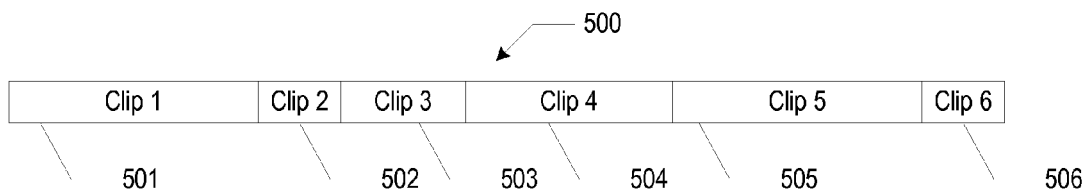
FIGS. 5A-5C are block diagrams illustrating an exemplary manner in which a media system performs client-based ad insertion.
Figure 5B:
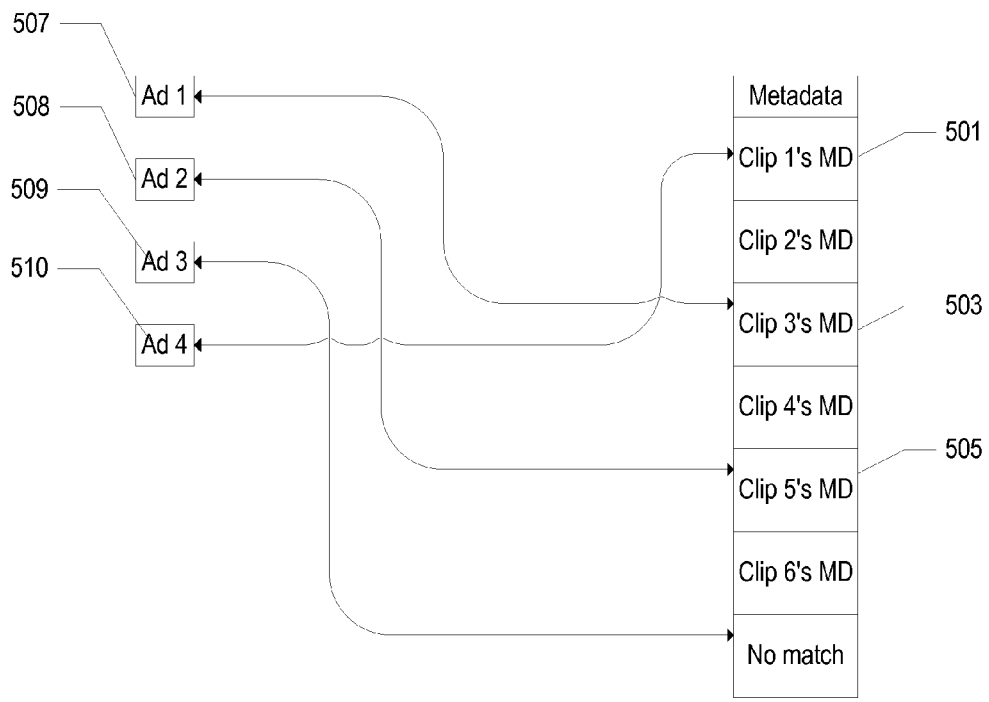
Figure 5C:
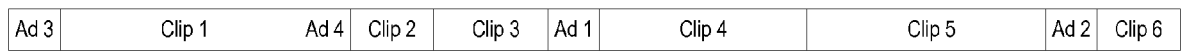

FIGS. 5A-5C are block diagrams illustrating an exemplary manner in which media system 100 performs client-based ad insertion. Consider that the segmentation component 406 segments the video 500 into six video clips 501, 502, 503, 504, 505 and 506 (see FIG. 5A). Further consider that four (4) advertisement clips 507, 508, 509, and 510, are associated with the video and stored in the memory 410 of the client computer 102. The content insertion engine 408 determines a topic of each of the video clips as a function of metadata included in each of the video clips, and inserts advertisement clips related to the determined topic. In this particular example, the content insertion engine 408 has determined that advertisement clip 507 is related to the determined topic of video clip 503, advertisement clip 508 is related to the determined topic of video clip 505, and that advertisement clip 510 is related to video clip 501. The content insertion engine 408 has also determined that advertisement clip 509 is not related to any of the video clips (see FIG. 5B). In this particular illustrated aspect of the invention, it can be seen that each advertisement clip is inserted after the clip to which it is related, and that the advertisement clip determined not to be related to any particular clip is inserted at the beginning of the video (see FIG. 5C).

As described above, according to an aspect of the invention, the advertisement clips and the video file as stored as separate files on the client computer 102. As a result, the content insertion engine 408 can update or replace advertisement clips without re-downloading the video file. More specifically, the content insertion engine 408 communicates with the media service 118 to check for updated ads that may be or more relevance to the user. For example, during playback of the video file, the content insertion engine 408 sends an update media content request to the media service application 302 requesting any updates or replacements for of each of the ads currently associated with the video being played back. If a particular advertisement currently associated with the video has expired or been rotated out, a new advertisement clip will be transferred to the client computer 102 to replace the current advertisement.

Figure 6:
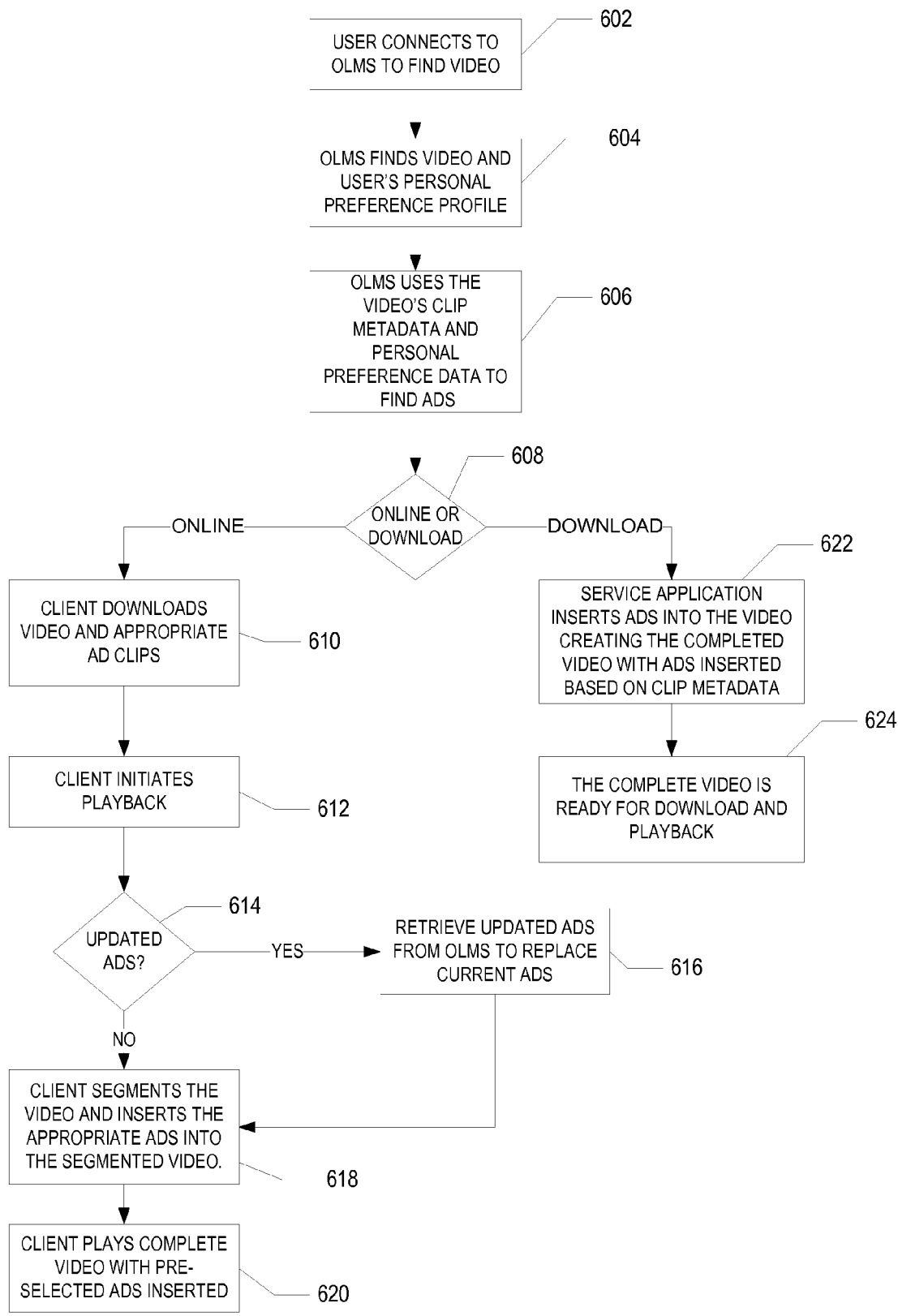
FIG. 6 is an exemplary flow chart illustrating a method for inserting ads into a video according to one exemplary embodiment of the invention.

Referring now to FIG. 6, an exemplary flow chart illustrates a method for inserting video clip ads into a video being downloaded from an online media service (OLMS) according to one exemplary embodiment of the invention. At 602, a user of a client computer connects to the media service and submits a retrieval request for a particular video to watch online or to download. A media service application is responsive to user input to retrieve the selected video and stored personal preference data for the user at 604. At 606, the media service application extracts metadata from each of the video clips included in the video and identifies advertisement clips for insertion into the video as a function of the extracted metadata and the retrieved personal preference data. The media service application determines whether the video retrieval request is an online viewing request or a download request at 608. If the video retrieval request is determined an online viewing request at 608, the media service application transfers the video and the identified advertisement clips to the client at 610. Notably, if the video clips are already on the client computer, the client application only downloads the selected video. At 612, the client application is responsive to user input to initiate playback of the video on the client. The client application communicates with the media service application to determine if an advertisement library associated with OLMS has been updated with new ads at 614. If the advertisement library has been updated at 614, the client application retrieves updated ads from the OLMS current at 616. At 618, the client application segments the video into video clips and inserts the appropriated ads into the segmented video based on metadata include in each of the video clips. The client plays the completed video with the inserted ads at 620. If the video retrieval request is determined to be a download request at 606, the service application segments the video into video clips and inserts the identified ads into the segmented video based on metadata include in each of the video clips at 622. The client application downloads the completed video with the inserted ads at 624.

In operation, computer 102 executes computer-executable instructions such as those illustrated in the FIG. 6 to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computerized method for integrating an advertisement clip into a video file being transferred from a server to a client for playback, said video file including one or more scenes, said computerized method comprising computer executable instructions for:

receiving, at the server, input from a user of the client designating the video file to be transferred, said video file including one or more scenes;

extracting metadata from the designated video file for each of the one or more scenes using a computerized metadata detection technique;

determining a value of a predefined metadata property associated with each of the one or more scenes;

determining the topic of each of the one or more scenes included in the designated video file based on the extracted metadata and the predefined metadata property;

querying an advertisement database, said advertisement database storing a plurality of advertisements clips and, for each of the plurality of advertisement clips, identifying a topic of said each advertisement clip;

comparing, for each of the one or more scenes, the determined topic of said each scene to the identified topic of at least one of the plurality of advertisement clips stored in the advertisement database;

determining, for each of the one or more scenes, whether an advertisement clip in the advertisement database is relevant to said each scene based on the comparing; and transferring the designated video file and the determined relevant advertisement clips to the client for playback.

2. The method of claim 1 further including:
retrieving personal preference data for the user of the client when no advertisement clip in the advertisement database is determined relevant to said each scene; and
determining a relevant advertisement clip as a function of the retrieved personal preference data.

3. The method of claim 1 further including editing the video file to include the determined relevant advertisement clips, and wherein the transferring includes transferring the edited video file to the client.

4. The method of claim 1 extracting metadata from the designated video file for each of the one or more scenes using a computerized metadata detection technique includes extracting metadata from the designated video file for each of the one or more scenes using one or more of the following metadata detection techniques: face detection, dynamic image peak detection, color value detection, dynamic image change detection face recognition, music beats detection, audio fingerprint detection, dynamic peaks detection, speech detection, word and phrase detection.

5. A system for selecting an advertisement clip for insertion into a video file being transferred from a server to a client for playback, said system comprising:

a processor configured to execute computer-executable components; and a memory having stored therein:

a retrieval component responsive to a retrieval request designating a video file for transfer from the server to the client to retrieve the designated video file from a media library linked to said server, said designated video file including one or more video clips;

an extraction component for extracting metadata from each of the video clips included in the designated video file using a computerized metadata detection technique, determining a value of a predefined metadata property associated with each of one or more scenes included in each video clip and determining a topic of the one or more scenes based on the extracted metadata and the predefined metadata property;

and wherein said retrieval component is further responsive to said extracted metadata for:

querying an advertisement library, said advertisement library storing a plurality of advertisements clips and, for each of the plurality of advertisement clips, identifying a topic of said each advertisement clip;

comparing, for each of the one or more scenes, the determined topic of said each scene to the identified topic of at least one of the plurality of advertisement clips stored in the advertisement library;

retrieving one or more advertisement clips relevant to the one or more scenes based on the comparing; and a transfer component for transferring the designated video file and the relevant one or advertisement clips to the client.

6. The system of claim 5, wherein the retrieval component further includes retrieving personal preference data for the user of the client, and retrieving one or more advertisement clips as a function of the retrieved personal preference data.

7. The system of claim 5, wherein a storage component is responsive to user input defining personal preference data to store the defined personal preference data in a preference database.

8. The system of claim 5 further including:
an authentication component for authenticating the retrieval request; and
a display component responsive to an authenticated retrieval request to transfer the names of the various video files available in the media library to the requesting client for display via a display linked to the client computer.

9. The system of claim 5, wherein the transfer component transfers the retrieved video file and advertisement clips separately to the client when the media retrieval request is an online viewing request, and wherein the transfer component integrates the retrieved video file and advertisement clips into a single integrated video/advertisement file for transfer to the client computer when the media retrieval request is a download request.

10. The system of claim 5, wherein the designated video file includes a plurality of video clips, each of said plurality of clips including one or more video frames, and wherein a segmentation component, executed on the client, defines one or more segment boundaries in the video file for segmenting the designated video file into the plurality of video clips based on metadata included in each of the one or more video frames.

11. The system of claim 10, wherein a content insertion engine, executed on the client, is responsive to the segmented video file to retrieve the one or more advertisement clips related to the video file from a memory of the client computer and to insert the retrieved advertisement between video clips in the designated video file during playback on the client.

12. The system of claim 5 wherein the extraction component extracts metadata from each of the one or more video clips included in the designated video file using one or more of the following computerized metadata detection techniques: face detection, dynamic image peak detection, color value detection, dynamic image change detection face recognition, music beats detection, audio fingerprint detection, dynamic peaks detection, speech detection, word and phrase detection.

13. A computerized method for integrating an advertisement clip into a video data stream being transferred from a server to a client for playback, said video data stream including one or more scenes, said computerized method comprising:

receiving, at the server, input from the user of the client designating the video data stream to be transferred;

extracting at the server metadata from the video data stream, said metadata defining a topic for each of one or more scenes in the video data stream, wherein said extracting includes determining a value of a predefined metadata property associated with each of the one or more scenes, said predefined metadata property defining a default topic of the scene associated therewith;

assigning a higher priority to one of the personal preference data for the user of the client and the metadata extracted from the video data stream;

retrieving a relevant advertisement clip for each of the one or more scenes based on the personal preference data for the user when the personal preference data is assigned the higher priority and retrieving a relevant advertisement clip for each of the one or more scenes based on the defined topic of the metadata of the one or more scenes when the metadata is assigned the higher priority; and transferring the video data stream and relevant advertisement clips to the client in an integrated data stream.

14. The method of claim 13, wherein the personal preference data defines a topic of interest for the user, and wherein retrieving the relevant video clip includes querying a database storing a plurality of video clips and a corresponding relevant topic for each of the plurality of video clips, and wherein the method further includes comparing the defined topic of interest to the corresponding relevant topic for each of the plurality of video clips to identify the relevant video clip.

15. The method of claim 13 further comprising editing the video data stream to include the determined relevant advertisement clips, and wherein the transferring includes transferring the edited video file to the client.

16. The method of claim 13 further including:

storing the received personal preference data in a preference database; and retrieving the personal preference data from the preference database.

\* \* \* \* \*

UNITED STATES PATENT AND TRADEMARK OFFICE
CERTIFICATE OF CORRECTION

PATENT NO.      : 7,613,691 B2
APPLICATION NO. : 11/425570
DATED           : November 3, 2009
INVENTOR(S)     : Gregory D. Finch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 274 days.

Signed and Sealed this

Nineteenth Day of October, 2010

David J. Kappos
*Director of the United States Patent and Trademark Office*